US012737936B2

(12) United States Patent
Spender et al.

(10) Patent No.: US 12,737,936 B2
(45) **Date of Patent: *Sep. 15, 2026**

(54) METHODS AND SYSTEMS FOR SECURE AUTHENTICATION IN A VIRTUAL OR AUGMENTED REALITY ENVIRONMENT

(71) Applicant: Worldpay, LLC, Symmes Township, OH (US)

(72) Inventors: Charlotte Spender, Tonbridge (GB); Daren L. Pickering, Rugby (GB)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,618

(22) Filed: Dec. 13, 2024

(65) Prior Publication Data

US 2025/0111365 A1 Apr. 3, 2025

Related U.S. Application Data

(63) Continuation of application No. 18/483,680, filed on Oct. 10, 2023, now Pat. No. 12,205,117, which is a (Continued)

(51) Int. Cl.
*G06Q 20/40* (2012.01)
*G06T 7/62* (2017.01)
(Continued)

(52) U.S. Cl.
CPC ..... *G06Q 20/4012* (2013.01); *G06Q 20/4014* (2013.01); *G06T 7/62* (2017.01);
(Continued)

(58) Field of Classification Search
CPC .......... G06Q 20/4012; G06Q 20/4014; G06Q 2220/00; G06T 7/62; G06T 11/60;
(Continued)

(56) References Cited

U.S. PATENT DOCUMENTS 6,549,194 B1 4/2003 McIntyre et al.
8,255,335 B1 * 8/2012 Barth .................... G07F 7/1075 705/72
(Continued)

FOREIGN PATENT DOCUMENTS

NZ 540853 A 12/2006

OTHER PUBLICATIONS

Zhen Yu, et al., An Exploration of Usable Authentication Mechanisms for Virtual Reality Systems, Jan. 5, 2017, IEEE, pp. 458-460 (Year: 2017).*
(Continued)

*Primary Examiner* — Nilesh B Khatri
(74) *Attorney, Agent, or Firm* — Bookoff McAndrews, PLLC

(57) ABSTRACT

A method of generating a virtual reality payment authentication entry interface includes receiving, over a computer network, a request for payment authorization; identifying a virtual reality interface; generating a plurality of payment authentication characters in the virtual reality interface; receiving user input associated with at least one character of the plurality of payment authentication characters in the virtual reality interface; and generating a payment authorization response to the request for payment authorization based on the received user input.

18 Claims, 10 Drawing Sheets

Related U.S. Application Data continuation of application No. 18/051,220, filed on Oct. 31, 2022, now Pat. No. 11,823,189, which is a continuation of application No. 17/720,114, filed on Apr. 13, 2022, now Pat. No. 11,823,188, which is a continuation of application No. 16/250,513, filed on Jan. 17, 2019, now Pat. No. 11,334,891.

(51) Int. Cl.

*G06T 11/60* (2006.01)
*G06T 17/00* (2006.01)
*H04L 9/40* (2022.01)
*G06F 3/01* (2006.01)

(52) U.S. Cl.

CPC .............. *G06T 11/60* (2013.01); *G06T 17/00* (2013.01); *H04L 63/083* (2013.01); *G06F 3/011* (2013.01); *G06Q 2220/00* (2013.01); *G06T 2200/24* (2013.01)

(58) Field of Classification Search

CPC ... G06T 17/00; G06T 2200/24; H04L 63/083; G06F 3/011

See application file for complete search history.

(56) References Cited

U.S. PATENT DOCUMENTS 10,083,442 B1* 9/2018 Quigley ............. G06Q 20/4012
10,438,225 B1* 10/2019 Reading ............. G06Q 30/0225
11,089,009 B2* 8/2021 Jakobsson .............. G06Q 20/40
2002/0188872 A1* 12/2002 Willeby ................ G07F 19/205 726/7
2005/0250538 A1* 11/2005 Narasimhan .......... G07F 7/1025 455/411
2006/0224523 A1* 10/2006 Elvitigala .......... G06Q 20/3829 705/64
2008/0172735 A1* 7/2008 Gao .......................... G07F 7/10 726/19
2010/0109920 A1 5/2010 Spradling
2012/0323788 A1* 12/2012 Keresman, III ...... G07F 7/1041 705/44
2013/0085942 A1* 4/2013 Shirol ................ G06Q 20/3255 705/44
2016/0036588 A1* 2/2016 Thackston .......... H04L 63/0838 713/168
2016/0364758 A1 12/2016 Achhra et al.
2017/0109752 A1 4/2017 Hubbard et al.
2017/0287289 A1* 10/2017 Lazzaro ............. G06Q 30/0641
2017/0364920 A1* 12/2017 Anand ................ H04L 63/0861
2018/0150838 A1* 5/2018 Ausems ............. G06Q 20/4012
2018/0285547 A1* 10/2018 Tsou ....................... G06F 21/36
2019/0058992 A1 2/2019 Kurian et al.
2020/0021571 A1* 1/2020 Jakobsson ............. H04L 63/083
2020/0097970 A1* 3/2020 Gupta ................ G06Q 20/4012
2020/0210557 A1* 7/2020 Pike ........................ G06F 21/62
2021/0209582 A1* 7/2021 Paliwal ................... G06F 21/31
2022/0277306 A1* 9/2022 Levitt ................ G06Q 20/4014
2023/0026982 A1* 1/2023 Taveau ................. G06Q 20/227

OTHER PUBLICATIONS

Yu, et al., "An Exploration of Usable Authentication Mechanisms for Virtual Reality Systems", Jan. 5, 2017, IEEE, pp. 458-460 (Year: 2017).

* cited by examiner 400
403
SELECT A CARD FOR PAYMENT
401
CREDIT CARD
1234 5678 9012 3456
401
CREDIT CARD
1234 5678 9012 3456
405

METHODS AND SYSTEMS FOR SECURE AUTHENTICATION IN A VIRTUAL OR AUGMENTED REALITY ENVIRONMENT

CROSS REFERENCE TO RELATED APPLICATION(S)

This application is a continuation of and claims the benefit of priority to U.S. application Ser. No. 18/483,680, filed Oct. 10, 2023, which is a continuation of and claims the benefit of priority to U.S. patent application Ser. No. 18/051,220, filed Oct. 31, 2022, which is a continuation of and claims the benefit of priority to Ser. No. 17/720,114, filed Apr. 13, 2022, which is a continuation of and claims the benefit of priority to U.S. patent application Ser. No. 16/250,513, filed Jan. 17, 2019, the entireties of which are incorporated herein by reference.

TECHNICAL FIELD

Various embodiments of the present disclosure relate generally to electronic payment processing and, more particularly, to configuring a virtual reality payment authentication entry interface.

BACKGROUND

Traditionally, merchants and other store owners have point of sale (POS) terminals that can accept check or payment card from consumers for goods and services. Such POS systems may include PIN pads at which a consumer may enter payment and/or personal information in order to complete payment processing requests for purchases. Increasingly, however, merchants and store owners may interact with users in virtual reality environments. Standard PIN pads may have a known arrangement of alphanumeric characters in the form of 12 buttons arranged in 4 rows and 3 columns. The first row may include numbers 1, 2, and 3; the second row may include the numbers 4, 5, and 6; the third row may include numbers 7, 8, and 9; and the last row may include "*", 0, and "#". Each of the numbers may also have associated letters of the alphabet in a standard format. This standard configuration means that an individual watching a user may easily detect or infer a user's PIN number by watching the user's selection of buttons and correlating the user's selections with standard positions of alphanumeric characters in a PIN pad.

Accordingly, there is a need for systems and methods that allow users to enter payment credentials (e.g., personal identification number ("PIN numbers"), Card Verification Value (CVVs), etc.) in a virtual reality environment, using an interface that does not correspond to a known configuration of alphanumeric characters. The present disclosure is directed to overcoming one or more of these above-referenced challenges.

SUMMARY OF THE DISCLOSURE

According to certain aspects of the disclosure, systems and methods are disclosed for generating a virtual reality payment authentication entry interface.

In accordance with another embodiment, a system is disclosed for generating a virtual reality payment authentication entry interface, the system comprising: a data storage device storing instructions for generating a virtual reality payment authentication entry interface in an electronic storage medium; and a processor configured to execute the instructions to perform a method including: receiving, over a computer network, a request for payment authorization; identifying a virtual reality interface; generating a plurality of payment authentication characters in the virtual reality interface; receiving user input associated with at least one character of the plurality of payment authentication characters in the virtual reality interface; and generating a payment authorization response to the request for payment authorization based on the received user input.

In one embodiment, a computer-implemented method is disclosed for generating a virtual reality payment authentication entry interface, the method comprising: receiving, over a computer network, a request for payment authorization; identifying a virtual reality interface; generating a plurality of payment authentication characters in the virtual reality interface; receiving user input associated with at least one character of the plurality of payment authentication characters in the virtual reality interface; and generating a payment authorization response to the request for payment authorization based on the received user input.

In accordance with another embodiment, a non-transitory machine-readable medium storing instructions that, when executed by the server, causes the server to perform a method for generating a virtual reality payment authentication entry interface, the method including: receiving, over a computer network, a request for payment authorization; identifying a virtual reality interface; generating a plurality of payment authentication characters in the virtual reality interface; receiving user input associated with at least one character of the plurality of payment authentication characters in the virtual reality interface; and generating a payment authorization response to the request for payment authorization based on the received user input.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a user may provide payment authentication credentials in a virtual reality environment, without having the credentials being detectable to an individual or observer in the same physical space as the user. The disclosed systems and methods discussed below may allow a user to securely enter their payment credentials in a VR environment. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
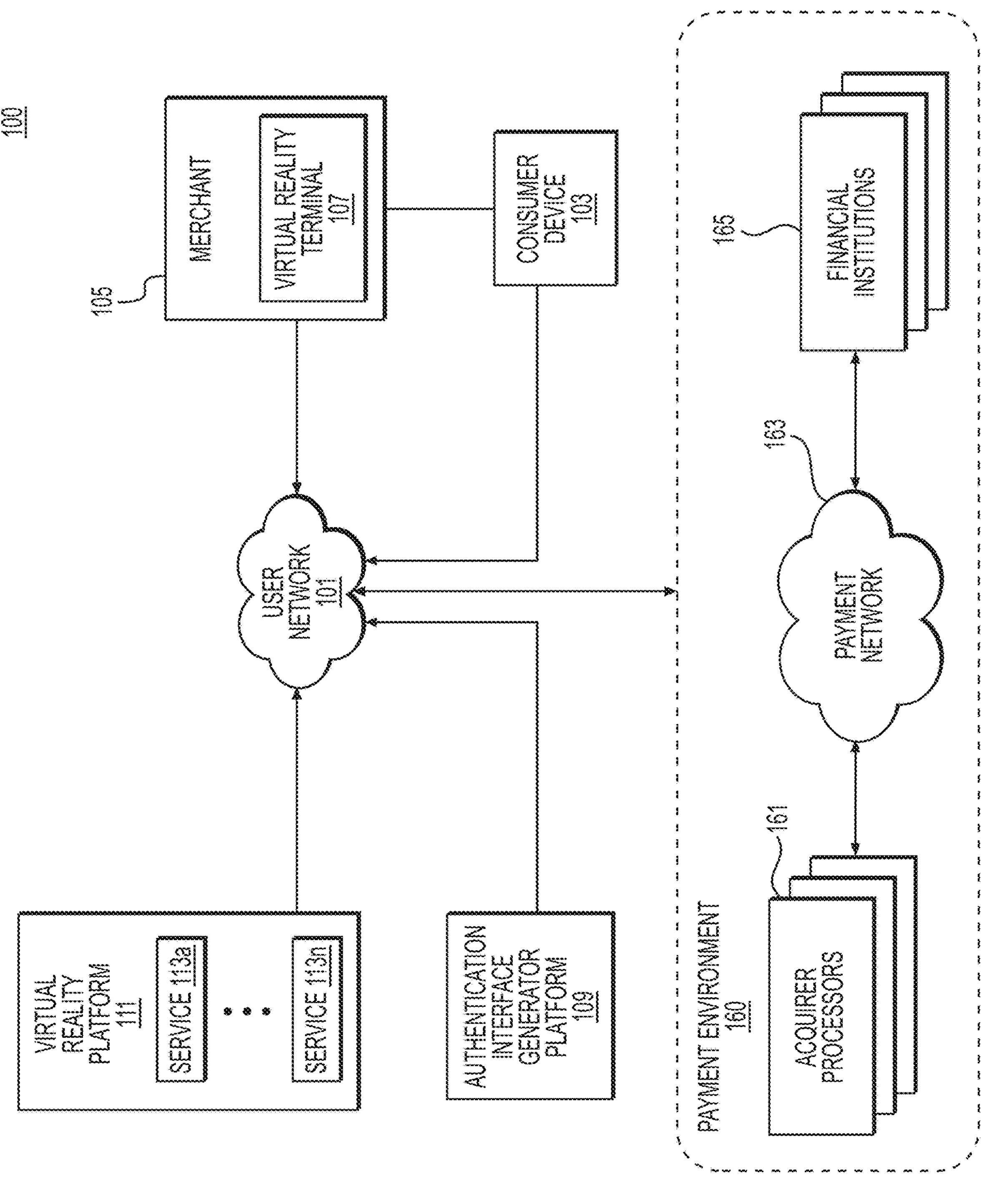
FIG. 1 depicts a block diagram of an environment and user network for authenticating payment transactions in virtual reality environments, according to one or more embodiments.

Various embodiments of the present disclosure relate generally to a virtual reality electronic payment infrastructure and to generating a virtual reality payment authentication entry interface.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

While some of the embodiments below refer to payment credential entry as being user's entry of their PIN number entry, no aspect of the present disclosure is specifically limited to the payment credential being a PIN number. It is intended that the following description encompasses the use of the present disclosure with any form of payment credential, including Card Verification Value (CVV), a payment vehicle number (e.g., a credit card number), a password, or any other type of payment credential verifying the user's identity through a plurality of (alphanumeric) characters.

Traditionally, merchants and other store owners may accept user payment credentials (e.g., PIN numbers) via point of sale (POS) devices that have buttons arranged in a standardized format of alphanumeric characters. The standardized format typically comprises an arrangement of 12 buttons positioned in 4 rows and 3 columns. This standard arrangement of alphanumeric characters provides easy detectability of a user's payment credentials from an observer nearby the user. Such detectability is especially problematic in a virtual reality environment, where the user may be less aware of their physical surroundings and the observers near them.

The systems and methods provide an improvement to the current problem of detectable payment credentials, by presenting alphanumeric characters, randomly, in a virtual reality environment that may be visible only to the user. In other words, the present embodiment describes a virtual reality payment authentication environment in which alphanumeric characters may be scattered throughout a virtual reality environment/interface shown to a user. The user may then be prompted to enter their payment credentials by selecting the randomly placed alphanumeric characters (e.g., via gesture(s) or a VR-compatible handheld device). Because the placement of the characters does not correspond to a known, standard configuration, an observer cannot detect the user's payment credentials just by watching their motions.

Figure 4A:
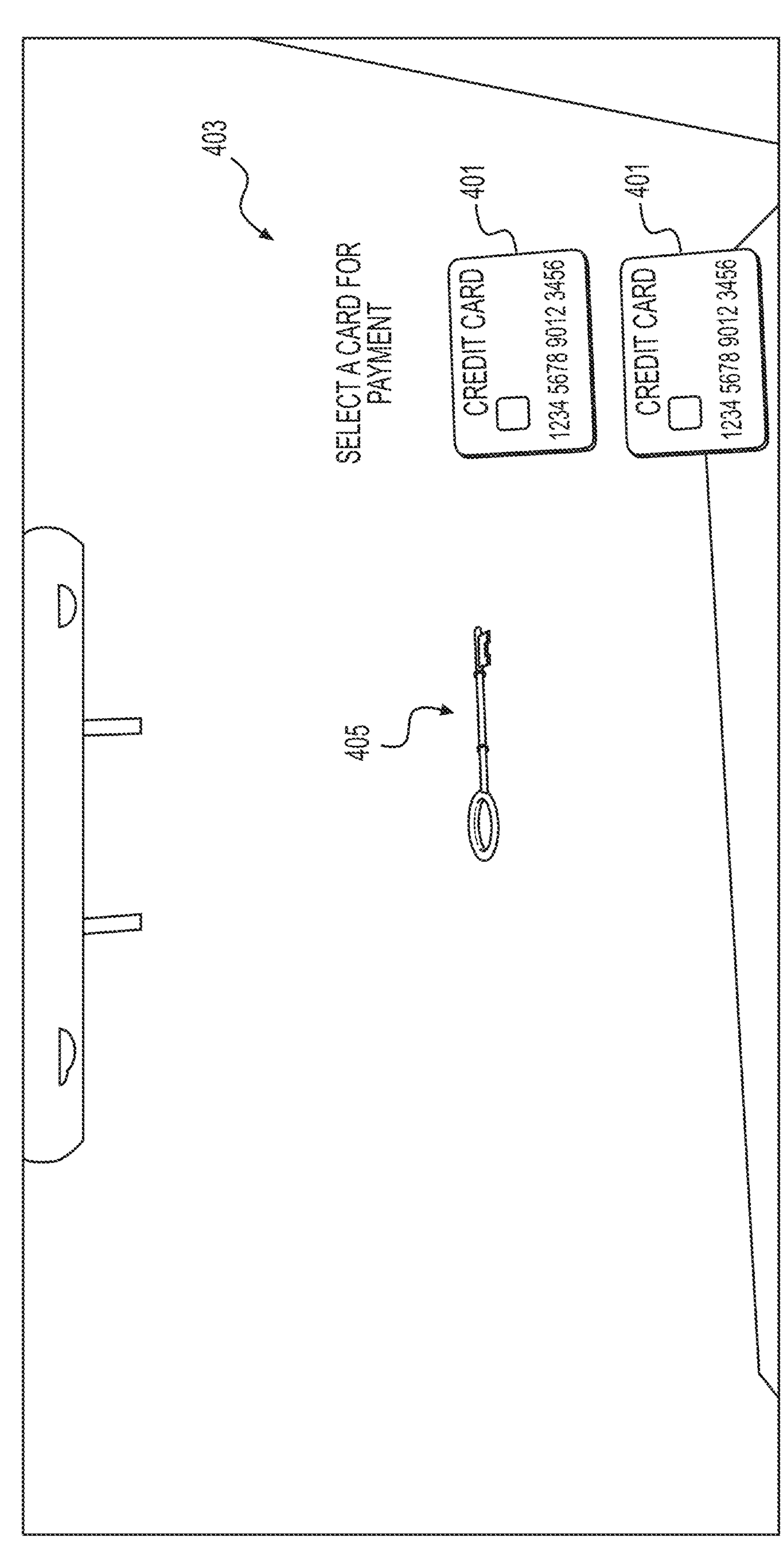
FIGS. 4A-4E depict virtual reality payment authentication entry interfaces, according to one or more embodiments.
Figure 4B:
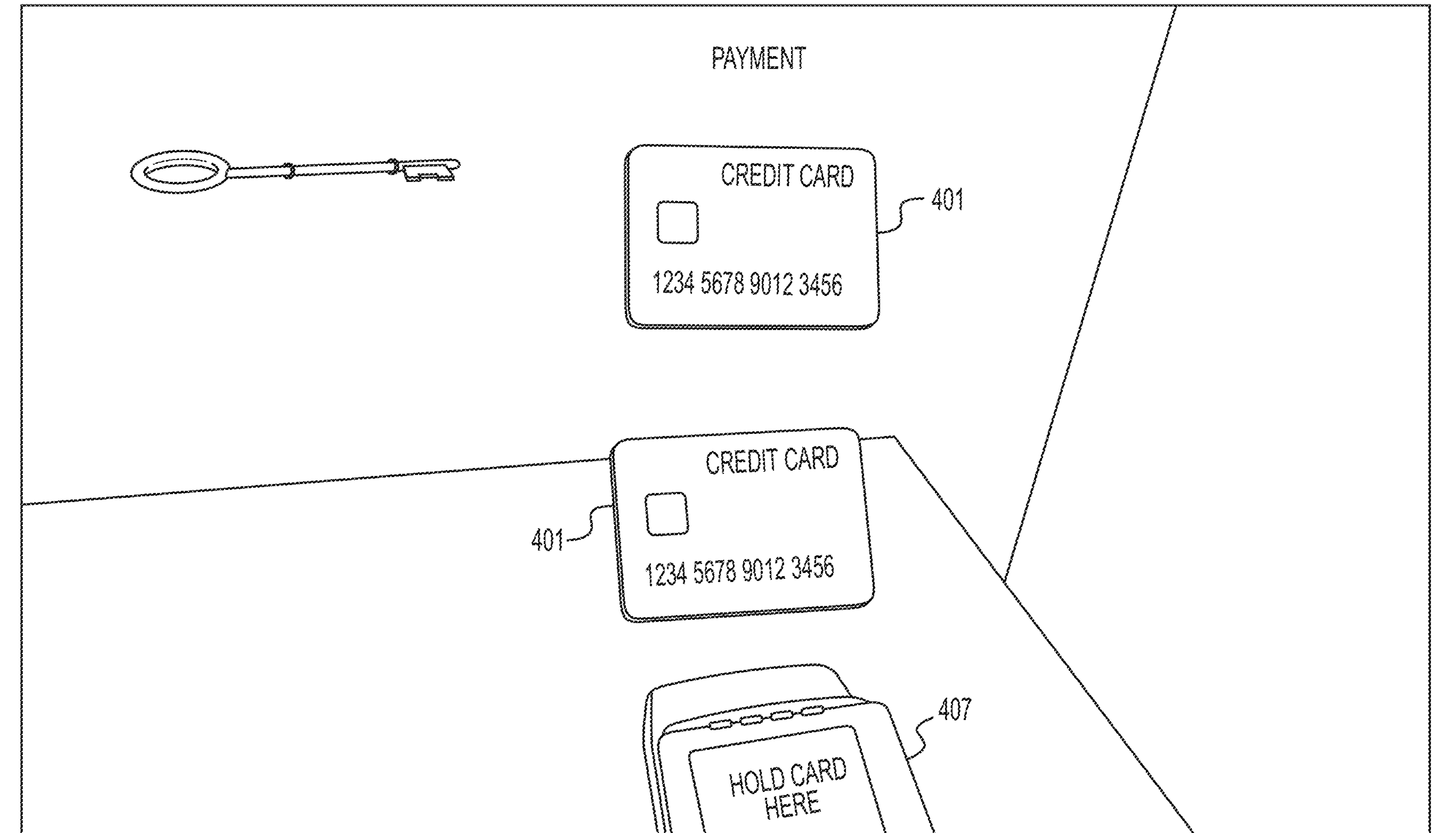
Figure 4C:
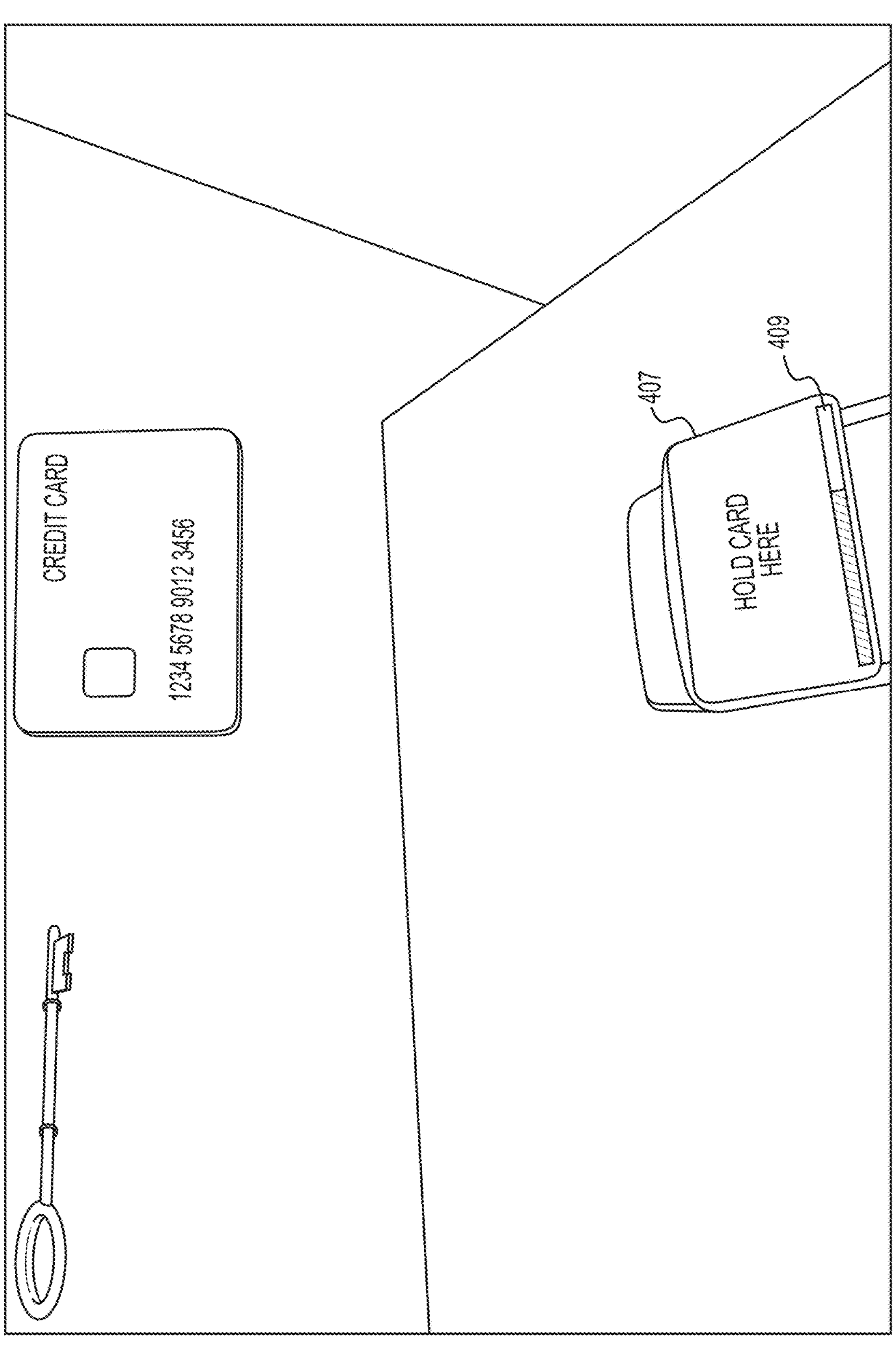
Figure 4D:
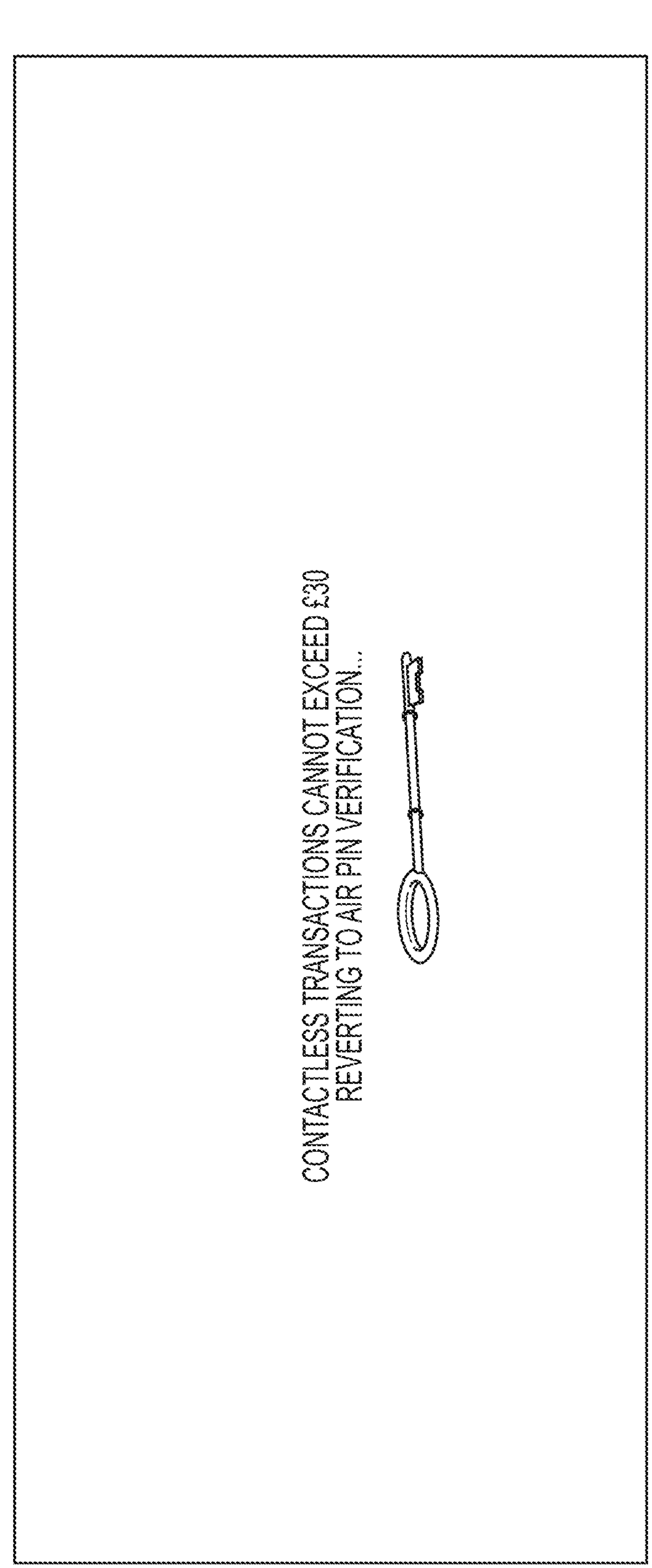
Figure 4E:
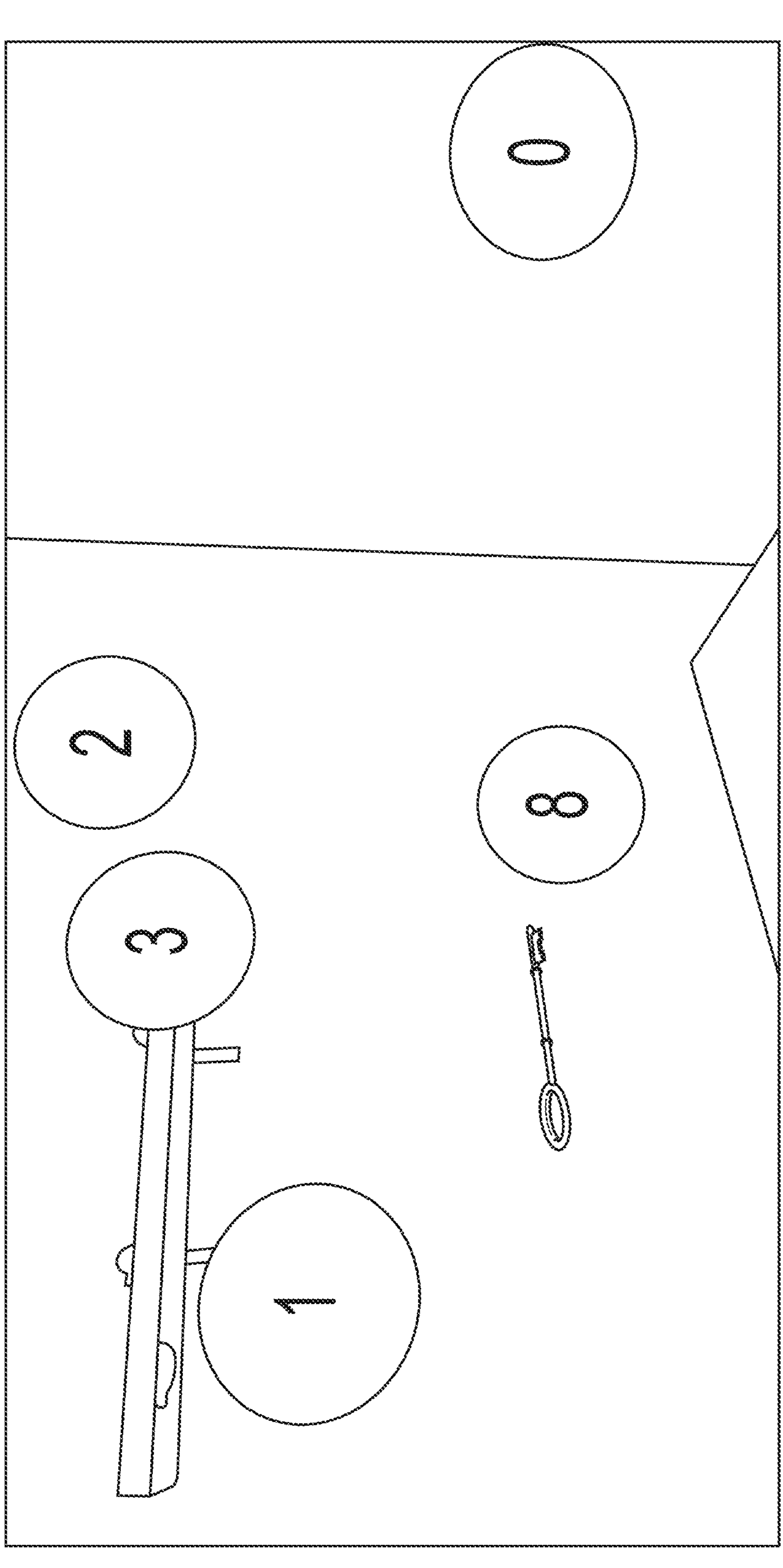

In one embodiment, the placement of the characters may be random in the virtual reality environment, e.g., as illustrated by FIG. 4E. For example, if the virtual reality environment shows a room in a house, the characters may appear in bubbles scattered throughout the room, or throughout the house. In one case, the placement of the characters may be randomized. Further, the complexity of the placement may increase, depending on the transaction amount associated with a payment authentication request. For example, a user, merchant, or payment vehicle may be associated with a predetermined transaction amount. In one scenario, payment authentication request transaction amounts that exceed the predetermined transaction amounts may trigger (or prompt the display of) the randomized virtual reality payment interface of the present embodiments. Payment authentication request transaction amounts that are lower than the predetermined transaction amounts may bypass the prompt for more payment credentials.

One embodiment may include multiple predetermined transaction threshold amounts, each with an elevated level of difficulty in the placement of the characters. The characters may be displayed as an overlay over the virtual reality environment shown to a user. Difficulty may be elevated in the character overlay, for example, by the placement of the characters, the proximity of each character to one another, the size of graphics showing the characters, the frequency that the placement of the characters is changed, or a combination thereof. For the following scenarios, one user, merchant, or payment vehicle may be associated with payment authentication threshold amounts of $50, $100, and $150.

For an embodiment where difficulty varies in the placement of the characters and/or a distance between characters, a payment authentication request transaction amount exceeding only the first threshold amount of $50 may prompt a request to the user to enter their payment credentials in the form of selecting characters scattered throughout a room of a virtual reality house. A payment authentication request transaction amount exceeding the second threshold amount of $100 may prompt a request to the user to enter their payment credentials in a more difficult setting by providing an interface where the characters are placed throughout various rooms of the virtual reality house. A payment authentication request transaction amount exceeding the third threshold amount of $150 may prompt a request to the user to enter their payment credentials in an even more difficult interface in which the characters are setting by providing an interface where the characters are placed in occluded spaces (e.g., closets, corners, behind curtains, stairwells, cabinets, under counters, etc.) throughout the virtual reality house.

Alternately or in addition relating to the size of the characters may refer to each of the characters being shown at a given size, e.g., the size of an average human head. The size may then shrink as the payment authentication request transaction amount increases, e.g., until the graphic of the characters is the size of an average human hand or fist. The circumference or approximate size of the character graphic may also be related to various predetermined transaction threshold amounts.

Alternately or in addition, difficulty level may be increased by the frequency of the change to the character graphics. In one such embodiment, the placement of the character graphics may stay the same until a user selects their PIN for a transaction amount exceeding only the first threshold amount of $50; a transaction amount exceeding the threshold amount of $100 may prompt a randomization of half of the positions of the character graphics in the virtual reality environment; and transaction amount exceeding the threshold amount of $150 may involve a randomization of the positions of the character graphics in the virtual reality environment every single time a user selects one character. In other words, each character may be displayed in a different position each time a user selects a character, for the interface associated with a transaction amount exceeding the highest threshold. In this case, the interface may be updated each time the user selects a character.

Another layer of difficulty may incorporate movement of the characters, e.g., the characters may be animated or moving objects for a user to "capture" via gesture or a handheld device. Higher transaction fees may correspond to animated (increasingly animated) characters in the virtual environment.

Referring now to FIG. 1, a block diagram is depicted of an exemplary environment 100 and user network 101 for authenticating payment transactions in virtual reality environments, according to an exemplary embodiment of the present disclosure. Environment 100 may include at least one consumer device 103. The consumer device 103 may include one or more virtual reality (VR) consumer products, e.g., a VR headset, VR or augmented reality (AR) eyewear, a VR immersive system, a smartphone, mobile phone, tablet computer, laptop, portable computer, watch, wearable device, or a combination thereof. Payment authentication may be collected via user interfaces displayed to a user using the consumer device 103. The payment authentication interface may be initiated by a merchant 105, authentication interface generator platform 109, virtual reality platform 111, or a combination thereof.

The merchant 105 may operate at least one virtual reality terminal 107. The virtual reality terminal 107 may be in contact with the consumer device 103. In one embodiment, the virtual reality terminal 107 may provide one or more payment authentication interface(s) to the consumer device 103 and/or receive user input (for payment authentication) from the consumer device 103. For example, the virtual reality terminal 107 may receive a user's input comprising a PIN number or other secure code comprising a payment authorization credential, from the consumer device 103.

The payment authentication interface(s) may be generated by the authentication interface generator platform 109 and/or the virtual reality platform 111. Virtual reality platform 111 may host one or more services 113*a*-113*n* (or services 113). The virtual reality platform 111 and services 113 may provide immersive VR experiences. In one embodiment, a consumer device 103 may be linked to a virtual reality platform service 113*a* via the virtual reality platform 111. The link may be initiated by Bluetooth, a Quick Response (QR) code, NFC tag, etc. and then maintained via secure tunnel (e. g., secure socket layer ("SSL"), virtual private network ("VPN"), etc.). In one embodiment, authentication interface generator platform 109 may prompt various display(s) inside the VR experiences of services 113*a-n*. For example, authentication interface generator platform 109 may prompt a service 113*a* to display a payment verification icon or graphic. The payment verification display may include a prompt to the user to submit a payment credentials (e.g., a secure code for payment to be verified). The secure code may include a personal identification number ("PIN number"). The authentication interface generator platform 109 may further generate displays including a graphic indicating successful completion of payment, or a graphic showing denial of payment or unsuccessful payment authorization.

Figure 2:
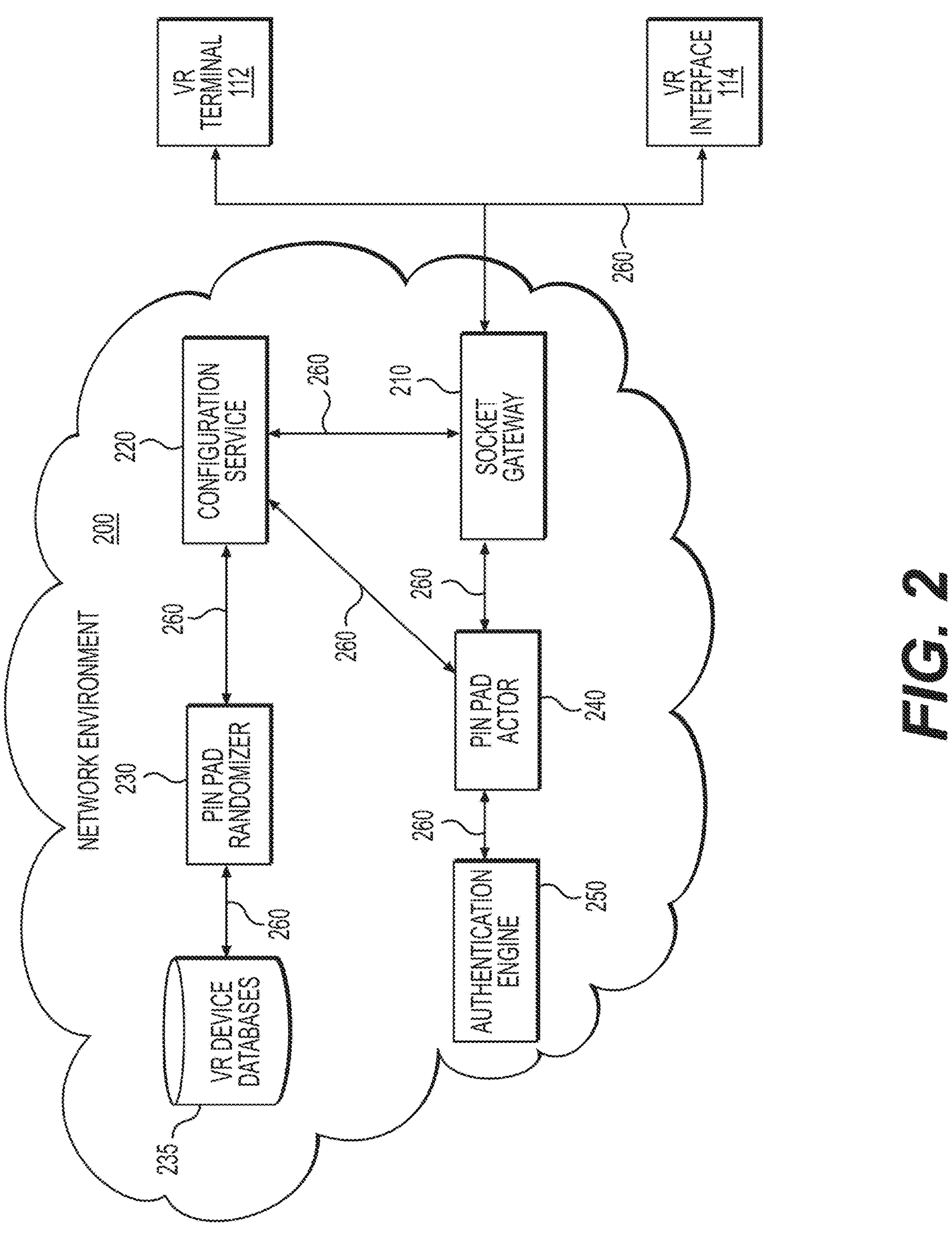
FIG. 2 depicts an exemplary system infrastructure for generating randomized virtual reality payment authentication entry interfaces using a computer network, according to one or more embodiments.

Once a consumer submits payment information via consumer device 103, virtual reality terminal 107 may send a payment request to a payment environment 160. The payment request may be sent by way of a computer network 163 to an acquirer processor 161. Alternatively, such a request may be sent by a component that controls a flow of a transaction, such as an authentication engine 250, as depicted in FIG. 2. Acquirer processor(s) 161 may request, by way of payment network 163, an electronic transfer of funds from the received funds to the financial institution(s) 165 associated with merchant 105 Merchant 105 may provide an infrastructure for processing electronic payment requests.

FIG. 2 depicts an exemplary system infrastructure for generating randomized virtual reality payment authentication entry interfaces, according to one or more embodiments. As shown in FIG. 2, an infrastructure 200 processing electronic payment requests may include a virtual reality terminal 112 and a virtual reality authentication interface 114. Virtual reality terminal 112 may refer to virtual reality terminal 107 of the merchant 105 in FIG. 1, or any transaction-related VR socket in communication with consumer device 103. Virtual reality interface 114 may be comprised of an interactive display shown at the consumer device 103. Authentication response (e.g., PIN number entry) may be received via interface 114. Virtual reality terminal 112 and virtual reality authentication interface 114 may be in communication with an infrastructure 200 via socket gateway 210. Socket gateway 210 may send commands to VR terminal 112 to generate entry interface 114.

Infrastructure 200 may further include a configuration service 220, a (PIN "pad") randomizer 230, and a VR device database 235. Configuration service 220 may, if necessary, configure the interface 114 upon connection of the VR terminal 112 to the infrastructure. Configuration service 220 may comprise an individual software vendor specializing in storing or verifying payment credentials. For example, configuration service 220 may work with randomizer 230 to generate randomized interfaces 114 for a consumer to use in entering their payment credentials. VR device database 235 may maintain configuration data associating each VR terminal 112 and interface 114. In this way, VR device database 235 and configuration service 220 may ensure that the display provided by randomizer 230 is compatible with the VR terminal 112 and user device 103 (not shown), and able to display VR interface 114.

In one embodiment, infrastructure 200 may further include PIN pad actor 240 and authentication engine 250. PIN pad actor 240 may provide a virtual representation of the interface 114 and may maintain a current state of the interface 114. In other words, configuration service 220 may prompt PIN pad actor 240 to generate a display or overlay to show at interface 114, and randomizer 230 may interact with actor 240 to generate a display/overlay with randomized components or icons. Authentication engine 250 may compare payment credentials received through interface 114, with stored payment credentials of the configuration service 200. If the received payment credentials match the stored credentials, authentication engine 250 may approve a payment request. If a match does not occur, authentication engine 250 may reject a transaction payment request and/or prompt generation of another interface 114 for the user to try again.

According to one or more embodiments, the components of infrastructure 200 may be connected by a computer network 260, such as, for example a local area network (LAN) or a wireless network, such as, for example, a WiFi network. However, other network connections among the components of infrastructure 200 may be used, such as, for example, a wide area network (WAN), the internet, or the cloud. According to one or more embodiments, the components of infrastructure 200 may operate to generate various interface(s) 114 that a user may use in a VR environment to enter payment authentication credentials. Methods of generating randomized virtual reality payment authentication entry interfaces according to one or more embodiments will be discussed with respect to FIG. 3A-FIG. 5 below. Functions of the components of infrastructure 200 will be described below with respect to exemplary methods for generating randomized virtual reality payment authentication entry interfaces.

Any suitable system infrastructure may be put into place for generating randomized virtual reality payment authentication entry interfaces. FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3A:
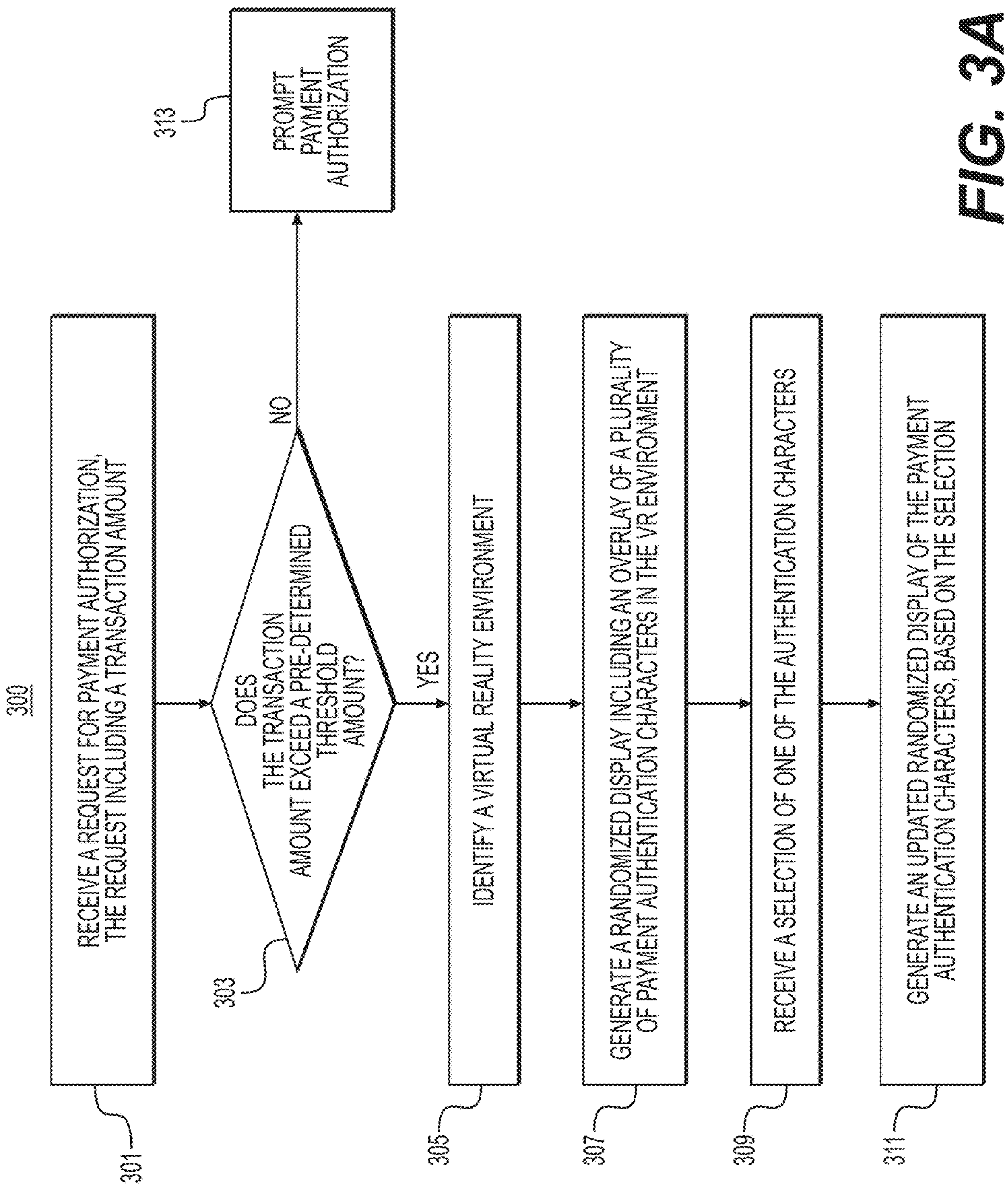
FIGS. 3A and 3B depict flowcharts of methods for verifying payment using the randomized virtual reality payment authentication entry interfaces, according to one or more embodiments.

FIG. 3A illustrates a method 300 for verifying payment. In particular, the verification method of method 300 includes generating a virtual reality payment authentication entry interface, according to one embodiment of the present disclosure. In operation 301, the merchant 105 (e.g., a merchant processor) and/or the consumer device 103 may receive (over network 101) a request for a payment authorization. The payment authorization request may originate from a virtual reality environment, as shown in the embodiment depicted by FIGS. 4A-4C. In one embodiment, the payment authorization request may be associated with a particular payment vehicle. FIG. 4A illustrates an exemplary virtual reality interface 400 displaying various payment vehicles 401 (e.g., credit cards, debit cards, smart cards, chip-based payment cards, single-use cards, prepaid cards, virtual cards, electronic currency (such as might be provided through a cellular telephone or personal digital assistant), and the like). In some cases, the virtual reality interface 400 may include a prompt, e.g., prompt 403 providing instructions to a user. In the illustrated interface 400, prompt 403 instructs a user to "select a card for payment." Interface 400 may further include an icon 405 denoting a user's position or reflecting a user's motions. Icon 405 may serve as a cursor, and a user may control the position of icon 405 using a handheld device, or through gestures, e.g., a hand or leg motion. As shown in FIG. 4B, interface 400 may further include a request portal icon 407. In one embodiment, a user may initiate a payment request by positioning a payment vehicle display 401 over the request portal icon 407. The request portal icon 407 may be configured to look like a point of sale (POS) device, or any other graphic to allow a user to definitively select a payment vehicle for payment. FIG. 4C shows an exemplary request portal icon 407 including a progress bar 409, indicating receipt of the selection of a payment vehicle. The payment vehicle selection may be associated with the payment authorization request.

In one embodiment, the request for payment authorization may include a transaction amount. In some cases, method 300 may be performed only if the transaction amount exceeds a pre-determined threshold amount (e.g., as shown in FIG. 4D, where the verification method 300 may be initiated for transaction amounts exceeding £30). In one embodiment, the merchant 105 and/or the consumer device 103 may receive or store the pre-determined threshold amount. Accordingly, operation 303 may include determining whether the received transaction amount exceeds a pre-determined threshold amount. If the transaction amount exceeds the threshold amount, method 300 may proceed to generating the virtual reality payment authentication interface. If not, payment authorization may be initiated (e.g., operation 313).

If the received transaction amount exceeds a pre-determined threshold amount, operation 305 may include identifying a virtual reality environment, e.g., a virtual reality interface as shown in FIGS. 4A-4E. The identification may take place, for example, via a linkage or electronic "handshake" between the virtual reality terminal 107 and a user's consumer device 103. Step 307 may include generating a plurality of payment authentication characters in the virtual reality interface. The payment authorization characters may include alphanumeric characters. The generated characters may comprise interactive overlay of the plurality of payment authentication characters over the identified virtual reality interface. The interactive overlay may seek or prompt payment authentication comprising a personal identification number (PIN).

As context, payment authorization may be provided if a user is able to verify their identify in association with the selected payment vehicle. Verification may take place by via entry of a correct PIN number, submission of biometric data, or any other information that certifies that the user is authorized to make payments with the selected payment vehicle. Exemplary FIGS. 4D and 4E illustrate a scenario where the requested form of verification comprises PIN entry, and the payment vehicles comprise credit cards.

Operation 309 may include receiving a selection of one of the plurality of payment authentication characters. The selection may include a user input, e.g., a gesture, drag and drop motion, a grabbing motion, a wave, a click, a point, etc. Step 311 may include generating an updated interactive overlay upon receipt of the user's input or selection. In one scenario, the placement of each of the characters of the plurality of payment authentication characters is randomized in the virtual reality interface, e.g., as shown in FIG. 4E. Step 311 may include updating the placement of each of the characters of the plurality of payment authentication characters is randomized in the virtual reality interface after receiving user input. The placement of the characters may be randomized.

Figure 3B:
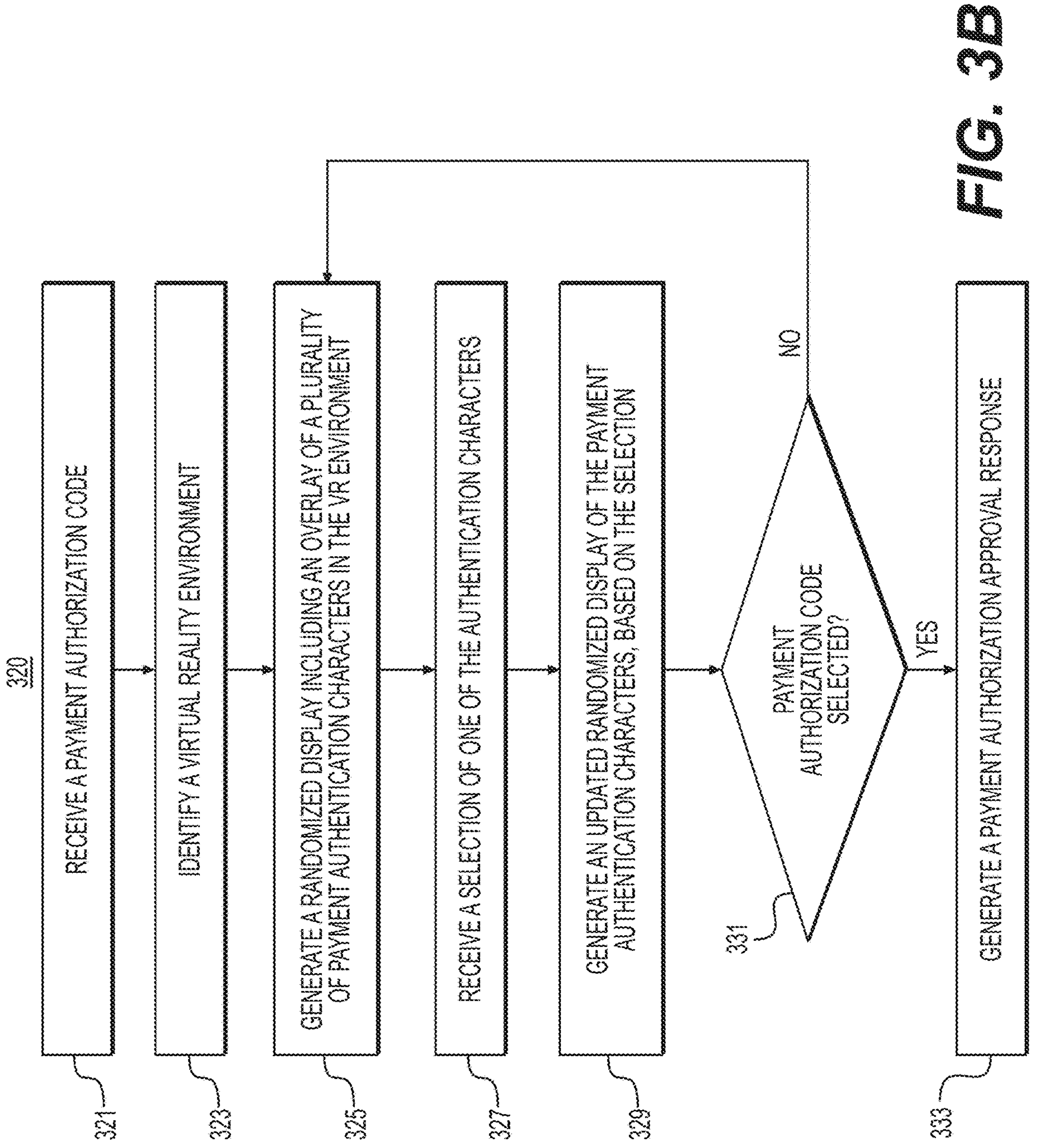

Based on the user's selection/inputs at the interactive display, a payment authorization response to the request for payment authorization may be generated. For example, if a user selects their PIN from the randomized display of characters, a payment authorization approval message may be transferred to complete a transaction. If the user does not successfully enter their PIN in the randomized display of characters, a payment authorization denial message may be generated to deny the transaction. In some cases, the randomized display may only permit the user a set number of options before refreshing. For example, if a PIN number comprises four characters, the display may randomize the display four times, once for each time a user enters a character selection. Method 300 may be implemented once, where a user has one chance to enter their PIN number correctly. Alternately, randomized displays may be presented multiple times, to provide a user with more than one opportunity to enter their PIN. FIG. 3B illustrates such an embodiment, where randomized virtual reality displays or overlays for payment credential entry may be provided multiple times.

FIG. 3B illustrates a method 320, in which updated interfaces are generated multiple times. For fraud purposes, the likelihood is low that method 320 would be implemented until a payment authorization code is selected (since this may allow a user to keep "guessing" payment credentials. However, method 320 may be useful to provide a user with multiple attempts in entering their payment credentials. The number of times updated interfaces are provided may correspond to payment amount. For example, a higher transaction amount may correspond to fewer opportunities for a user to enter their payment credentials, than in a scenario with a lower transaction amount.

In one embodiment of method 320, operation 321 may include first receiving a payment authorization code (e.g., a PIN). The payment authorization code may be received by the virtual reality terminal 107, the consumer device 103, and/or an entity at the payment network 163. This received payment authorization code may be associated with the user and their payment vehicle, and it may be used to verify the user's input. As with operation 305 of method 300, operation 323 may include identifying a virtual reality environment (e.g., interface 400 of FIGS. 4A-4E).

Operation 325 may include generating a randomized display including an overlay of a plurality of payment authentication characters in the virtual reality environment. Operation 327 may include receiving a selection of at least one of the displayed authentication characters. Operation 329 may include generating an updated randomized display of the payment authentication characters based on the user's selection. If the user's input or selection matches the received payment authorization code (of operation 321), a payment authorization approval response may be generated (e.g., operations 331 and 333). If the user's input does not match the received payment authorization code, the payment denial response (or denial of payment authorization response) may be generated, or another randomized display may be generated and presented in the VR environment (e.g., operations 331 and 325).

Figure 5:
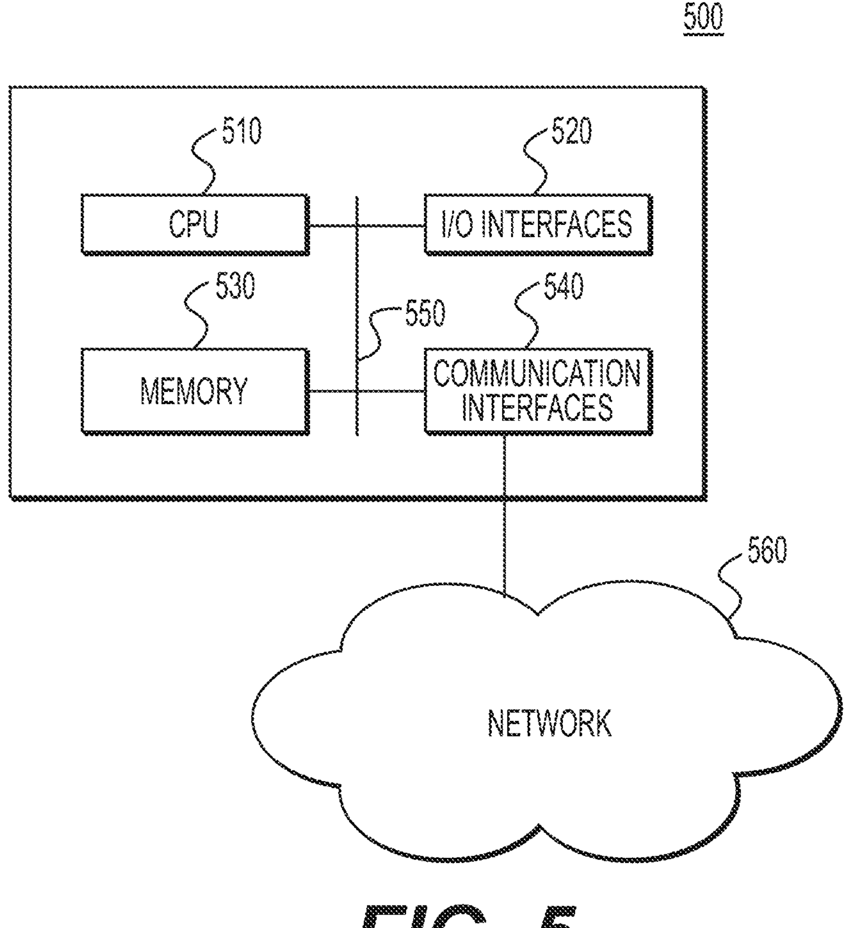
FIG. 5 is a block diagram of an example computing environment, according to one or more embodiments.

The systems and processes described above may be performed on or between one or more computing devices, e.g. configuration service. FIG. 5 illustrates an example computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a POS terminal associated with the merchant 105, a back-office system of a merchant 105, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 may include a processor 510 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 may also include one or more memories 530, for example read-only memory (ROM), random access memory (RAM), cache memory associated with the processor 510, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 510, or memories 530 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 540 may be configured to transmit to, or receive data from, other computing devices 500 across a network 560. The network and communication interfaces 540 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 540 may include wire data transmission links such as Ethernet and TCP/IP. The communication interfaces 540 may include wireless protocols for interfacing with private or public networks 560. For example, the network and communication interfaces 608 and protocols may include interfaces for communicating with private wireless networks such as Wi-Fi network, one of the IEEE 802.11x family of networks, or another suitable wireless network. The network and communication interfaces 540 may include interfaces and protocols for communicating with public wireless networks 560, using for example wireless protocols used by cellular network providers, including Code Division Multiple Access (CDMA) and Global System for Mobile Communications (GSM). A computing device 500 may use network and communication interfaces 540 to communicate with hardware modules such as a database or data store, or one or more servers or other networked computing resources. Data may be encrypted or protected from unauthorized access.

In various configurations, the computing device 500 may include a system bus 610 for interconnecting the various components of the computing device 500, or the computing device 500 may be integrated into one or more chips such as programmable logic device or application specific integrated circuit (ASIC). The system bus 550 may include a memory controller, a local bus, or a peripheral bus for supporting input and output devices 520, and communication interfaces 560. Example input and output devices 520 include keyboards, keypads, gesture or graphical input devices, motion input devices, touchscreen interfaces, one or more displays, audio units, voice recognition units, vibratory devices, computer mice, and any other suitable user interface.

The processor 510 and memory 530 may include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:

receiving, by one or more processors, an authorization code associated with a payment vehicle of a user;

generating, by the one or more processors, a display of a plurality of characters within a virtual reality environment of a device associated with the user for authenticating a transaction;

receiving, by the one or more processors, a selection of one or more characters from the plurality of characters from the device associated with the user;

determining, by the one or more processors, whether the one or more characters matches the authorization code; and generating, by the one or more processors, an updated display of the plurality of characters within the virtual reality environment upon determining the one or more characters do not match the authorization code, wherein movements of the plurality of characters in the updated display within the virtual reality environment are increased based on an increase in a transaction value.

2. The computer-implemented method of claim 1, wherein a higher transaction value corresponds to a lower number of allowed attempts for entering the authorization code and a lower frequency of the updated display of the plurality of characters within the virtual reality environment.

3. The computer-implemented method of claim 1, wherein a lower transaction value corresponds to a higher number of allowed attempts for entering the authorization code and a higher frequency of the updated display of the plurality of characters within the virtual reality environment.

4. The computer-implemented method of claim 1, wherein generating the display of the plurality of characters within the virtual reality environment includes overlaying the plurality of characters in a visually randomized order.

5. The computer-implemented method of claim 1, wherein generating the updated display of the plurality of characters includes variations in one or more of distance, movements, size, or complexity of the plurality of characters within the virtual reality environment.

6. The computer-implemented method of claim 5, further comprising:

increasing, by the one or more processors, the distance between the plurality of characters in the updated display within the virtual reality environment based on the increase in the transaction value.

7. The computer-implemented method of claim 5, further comprising:

decreasing, by the one or more processors, the size of the plurality of characters in the updated display within the virtual reality environment based on the increase in the transaction value.

8. The computer-implemented method of claim 5, further comprising:

increasing, by the one or more processors, the complexity of the plurality of characters in the updated display by placing the plurality of characters in one or more occluded spaces within the virtual reality environment based on the increase in the transaction value.

9. The computer-implemented method of claim 1, further comprising:

updating, by the one or more processors, an interactive overlay of the display of the plurality of characters within the virtual reality environment based on user selection, wherein the updating includes changing placements of each of the plurality of characters.

10. A system comprising:

one or more processors of a computing system; and at least one non-transitory computer readable medium storing instructions which, when executed by the one or more processors, cause the one or more processors to perform operations comprising:

receiving an authorization code associated with a payment vehicle of a user;

generating a display of a plurality of characters within a virtual reality environment of a device associated with the user for authenticating a transaction;

receiving a selection of one or more characters from the plurality of characters from the device associated with the user;

determining whether the one or more characters matches the authorization code; and generating an updated display of the plurality of characters within the virtual reality environment upon determining the one or more characters do not match the authorization code, wherein movements of the plurality of characters in the updated display within the virtual reality environment are increased based on an increase in a transaction value.

11. The system of claim 10, wherein a higher transaction value corresponds to a lower number of allowed attempts for entering the authorization code and a lower frequency of the updated display of the plurality of characters within the virtual reality environment.

12. The system of claim 10, wherein a lower transaction value corresponds to a higher number of allowed attempts for entering the authorization code and a higher frequency of the updated display of the plurality of characters within the virtual reality environment.

13. The system of claim 10, wherein generating the display of the plurality of characters within the virtual reality environment includes overlaying the plurality of characters in a visually randomized order.

14. The system of claim 10, wherein generating the updated display of the plurality of characters includes variations in one or more of distance, movements, size, or complexity of the plurality of characters within the virtual reality environment.

15. The system of claim 14, further comprising:

increasing the distance between the plurality of characters in the updated display within the virtual reality environment based on the increase in the transaction value.

16. A non-transitory computer readable medium, the non-transitory computer readable medium storing instructions which, when executed by one or more processors of a computing system, cause the one or more processors to perform operations comprising:

receiving an authorization code associated with a payment vehicle of a user;

generating a display of a plurality of characters within a virtual reality environment of a device associated with the user for authenticating a transaction;

receiving a selection of one or more characters from the plurality of characters from the device associated with the user;

determining whether the one or more characters matches the authorization code; and generating an updated display of the plurality of characters within the virtual reality environment upon determining the one or more characters do not match the authorization code, wherein movements of the plurality of characters in the updated display within the virtual reality environment are increased based on an increase in a transaction value.

17. The non-transitory computer readable medium of claim 16, wherein a higher transaction value corresponds to a lower number of allowed attempts for entering the authorization code and a lower frequency of the updated display of the plurality of characters within the virtual reality environment.

18. The non-transitory computer readable medium of claim 16, wherein a lower transaction value corresponds to a higher number of allowed attempts for entering the authorization code and a higher frequency of the updated display of the plurality of characters within the virtual reality environment.

* * * * *